ns Patent Office 2,840,536
Patented June 24, 1958

2,840,536

AMINE SOLUTIONS OF HIGH MOLECULAR POLYESTERS

Otto Fuchs, Frankfurt am Main, Germany, assignor to Farbwerke Hoechst Aktiengesellschaft vormals Meister Lucius & Bruning, Frankfurt am Main, Germany, a corporation of Germany No Drawing. Application March 2, 1954
Serial No. 413,699

Claims priority, application Germany March 7, 1953

4 Claims. (Cl. 260—32.6)

The present invention relates to compositions of matter. Shaped structures, such as threads, foils, and the like, composed of polyesters of terephthalic acid with aliphatic dihydroxy-compounds, for example, high molecular, linear polyethylene glycol terephthalate, are usually formed from a fused mass of the polyester. Shaped structures can also be made from solutions of the polyester and, if necessary, a non-solvent for the polyester may be added. Phenols and nitrobenzene are known to be good solvents for such polyesters at a raised temperature, but it is necessary to distill or extract the solution consisting of a mixture of solvents and non-solvent(s) in order to recover the dissolving and non-dissolving components again. When using solutions which contain phenol as a solvent, water can be used as the non-solvent, so that only the phenol has to be recovered. But even then, distillation or extraction is necessary. It exists therefore, a demand for such solvents for the polyesters as are water soluble and can be recovered by simple methods from the aqueous solutions.

I have found that primary, secondary or tertiary aromatic or heterocyclic amines containing nitrogen in the nucleus which both can also be partially hydrogenated and substituted by organic radicals, are well suited as solvents for polyesters of terephthalic acid with an aliphatic dihydroxy-compound.

Especially suited are compounds of the formula $$R_1NHR_2$$

in which $R_1$ represents a residue having one of the following formulae:

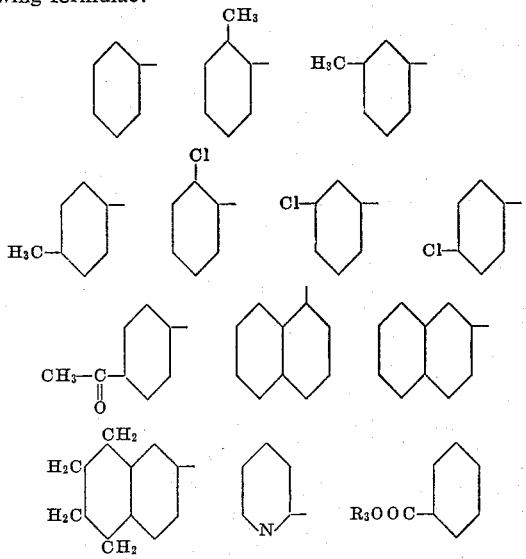

(in which $R_3$ represents lower alkyl groups such as methyl, ethyl, propyl or butyl) and $R_2$ represents hydrogen, lower alkyl groups or a residue represented by $R_1$.

Of course, mixtures of the mentioned compounds may also be used for the said purpose.

These compounds are not only good solvents for the polyesters, but, when water is used as a nonsolvent, the solutions prepared with amines can be readily processed and the amines can be recovered by simple methods, as amines are readily soluble in water which has been acidified, for example, with hydrochloric acid or sulphuric acid and can be precipitated again by neutralising the aqueous solutions thus obtained with, for example, a solution of sodium hydroxide. As the amine layer can directly be reused as solvent for the polyester and as the aqueous layer which still contains a certain amount of amines, can be reused after having been acidified, no additional working up of the layers is necessary, so that there occurs practically no loss of amines. It is only necessary, to separate from time to time the sodium salts which have precipitated from the aqueous salt solutions after these have become saturated.

Therefore, the use of amines as solvents for the mentioned polyesters constitutes a considerable improvement. Furthermore, solutions of the polyester in amines are even then of special advantage, if no water is used for the preparation of the solutions. It must be especially mentioned that some amines exhibit such good dissolving properties for the polyesters that solutions of the polyesters therein may be cooled to even about $+10°$ C. without losing their homogeneity either owing to crystallization of the solvent as happens at $41°$ C. with solutions in phenol, or owing to separation of the polyester, as occurs at $100°$ C. with solutions in nitrobenzene. This property is of practical importance when, in order to achieve drying of the shaped structures as rapidly as possible, a non-solvent of low boiling point such as methanol, methyl acetate, petroleum ether and the like has to be used in conjunction with the solvent for the preparation and processing of the solutions.

These amine solutions show a tendency to gel formation after standing for some time at, for example, room temperature. The time until gel formation sets in depends on the nature of the solvent and the concentration of the solution. For example, with a solution of polyethylene glycol terephthalate of 1% strength in aniline at $20°$ C., gel formation sets in already after 30 minutes, with a solution of 1% strength in 3-chloraniline, gel formation does not set in even after 5 days.

With a solution of 5% strength of the same polyester in 3-chloraniline at $20°$ C., gel formation sets in after 3 hours, with a solution of 20% strength, after 30 minutes. When the temperature at which the solutions are kept is raised, the time until gel formation sets in, is considerably longer. When solutions which tend to gel formation are used, it is necessary to work at a correspondingly raised temperature and to carry out the processing as quickly as possible.

As solvents for the solutions named above there may be mentioned, for example amines which are derived from benzene, cyclohexadiene, cyclohexene, naphthalene, tetrahydronaphthalene, pyridine or quinoline. These amino compounds may also contain other groups as substituents, especially hydroxy groups, lower alkyl groups such as methyl, ethyl, propyl or butyl groups, lower alkoxy groups such as methoxy, ethoxy, propoxy or butoxy groups, nitro groups and/or halogen atoms such as fluorine, chlorine, bromine or iodine. In addition they may contain aldehyde groups, keto groups, acid groups and/or functional acid groups.

As softeners for the polyesters there are used advantageously compounds of the above mentioned kind which boil above $250°$ C. under atmospheric pressure. The softeners are incorporated in the polyester by kneading or rolling the mixture at a temperatrue at which the mixture is viscous. This temperature is at least 150° C. and may be as high as the melting point of the polyester.

The concentration of the polyester in the solvent or in a mixture of the solvents and a diluent may vary depending on the molecular weight of the polyester.

Some of the above mentioned compounds serving as solvents melt above 100° C., so that when solutions in these solvents are used, there is a risk that the solvent may crystallize out. However, the melting point can be lowered by using a mixture of two or more compounds of the kind mentioned above.

Furthermore, these compounds may also be diluted with other substances which by themselves do not dissolve the polyester or dissolve it only with difficulty. As diluents there may be mentioned compounds such as naphthalene, diphenyl, tetrahydronaphthalene, decahydronaphthalenexylene, methylnaphthalene and nesitylene. The proportion of the diluent in the solvent-diluent mixture may be up to 50%.

The following example serves to illustrate the invention but it is not intended to limit it thereto.

Solubility tests were carried out by dissolving 1 gram of polyethylene glycol terephthalate in 100 cc. of the solvent or solvent mixture, and then determining the temperature at which the polyester separated out on cooling. This temperature is referred to as "solubility temperature" and can serve only as a numerical value for comparing the different solvent powers of the various solvents or solvent mixtures. In order to prepare the solutions rapidly it is of advantage to use the solvent at a temperature which, depending on the concentration of the polyester, is about 20 to about 40 degrees centigrade above the solubility temperature and which should be at least 20° C. The specific viscosity of the polyester used was 0.64 for a solution of 1% strength in phenol at 50° C. The results are given in the following table, in which the proportions of the solvents in the solvent mixtures are by weight:

If desired, solutions of the polyester in the above solvents can be prepared which contain a maximum of 40% of the polyester, the solvent thus being present in at least about 1.5 times the weight of the polyester.

I claim:

1. A solution comprising a high molecular linear aliphatic glycol polyester of terephthalic acid dissolved in a solvent of the formula $R_1$—NH—$R_2$ wherein $R_1$ is a radical selected from the group consisting of phenyl, chlorophenyl, lower alkyl phenyl having up to 4 carbon atoms in the alkyl chain, acetophenyl, carbo-lower alkoxy phenyl having up to 4 carbon atoms in the alkyl chain, pyridyl, lower alkyl pyridyl having up to 4 carbon atoms in the alkyl chain, naphthyl and hydronaphthyl radicals, and wherein $R_2$ is a radical selected from the group consisting of $R_1$, hydrogen and lower alkyl radicals having up to 4 carbon atoms, said solvent being present in at least about 1.5 times the weight of said polyester.

2. Solutions comprising 3-chloroaniline having dissolved therein a high molecular linear aliphatic glycol polyester of terephthalic acid, said 3-chloroaniline being present in at least about 1.5 times the weight of said polyester.

3. Solutions comprising diphenyl amine having dissolved therein a high molecular linear aliphatic glycol polyester of terephthalic acid, said diphenyl amine being present in at least about 1.5 times the weight of said polyester.

4. Solutions comprising 5,6,7,8-tetra-hydro-2-naphthylamine having dissolved therein a high molecular linear aliphatic glycol polyester of terephthalic acid, said 5,6,7,8-tetra-hydro-2-naphthylamine being present in at least about 1.5 times the weight of said polyester.

References Cited in the file of this patent

FOREIGN PATENTS 609,947   Great Britain _____ Oct. 8, 1948

| Solvent | Properties of the polyester in solution |
|---|---|
| aniline | still dissolved at 12° C.[1] |
| N-monomethyl aniline | solubility temperature 60° C. |
| 3-chloraniline | still dissolved at 12° C. |
| 3-aminotoluene | still dissolved at 12° C.[1] |
| 1-naphthylamine | solubility temperature, 55° C.[2] |
| diphenylamine | solubility temperature, 55° C. |
| 4-aminobenzoic acid methyl ester | solubility temperature, 135° C. |
| 4-aminoacetophenone | solubility temperature, 125° C. |
| N-methyl-acetanilide | solubility temperature, 110° C. |
| 2-aminopyridine | solubility temperature, 100° C. |
| α-amino-α-picoline | solubility temperature, 145° C. |
| 8-aminoquinoline | solubility temperature, 60° C.[2] |
| 1-naphthylamine+benzyl alcohol 1:1 | solubility temperature, 12° C. |
| 2-naphthylamine+benzyl alcohol 1:1 | solubility temperature, 60° C.[2] |
| aniline+p-xylene 1:1 | solubility temperature, 65° C. |
| aniline+pyridine 1:1 | solubility temperature, 115° C. |
| α-amino-α-picoline+benzyl alcohol 1:1 | solubility temperature, 135° C. |
| 5,6,7,8-tetrahydro-2-naphthyl amine | solubility temperature, 35° C.[2] |

[1] When the solution is stored at 12° C., gel formation sets in gradually.
[2] 5° C. below this temperature the solvent crystallizes out of the solution.

UNITED STATES PATENT OFFICE
CERTIFICATE OF CORRECTION

Patent No. 2,840,536                           June 24, 1958

Otto Fuchs

It is hereby certified that error appears in the printed specification of the above numbered patent requiring correction and that the said Letters Patent should read as corrected below.

Column 3, line 17, for "nesitylene" read -- mesitylene --; line 34, for "20° C." read -- 120° C. --.

Signed and sealed this 13th day of January 1959.

(SEAL)
Attest:
KARL H. AXLINE

Attesting Officer

ROBERT C. WATSON
Commissioner of Patents